United States Patent Office 3,433,020
Patented Mar. 18, 1969

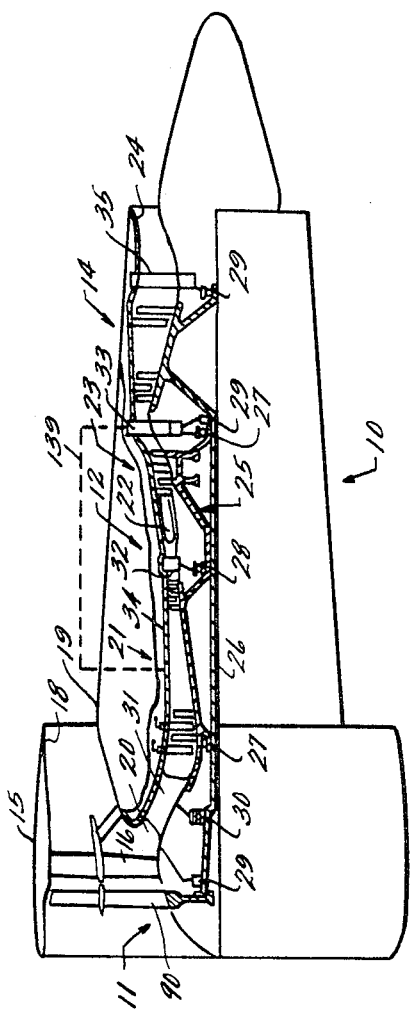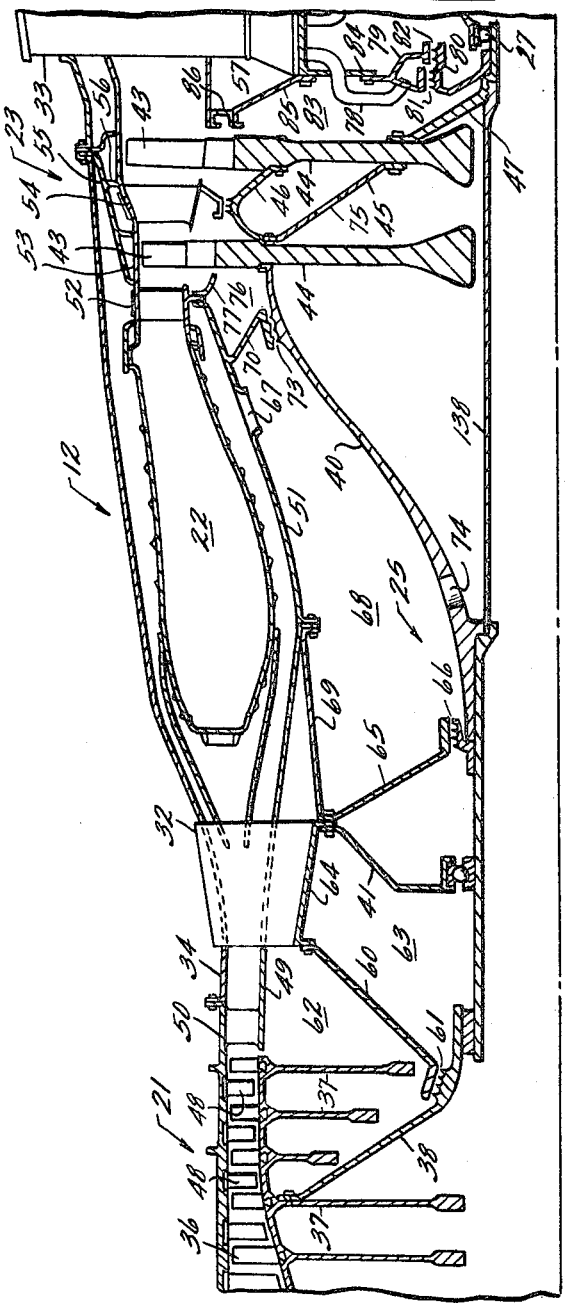

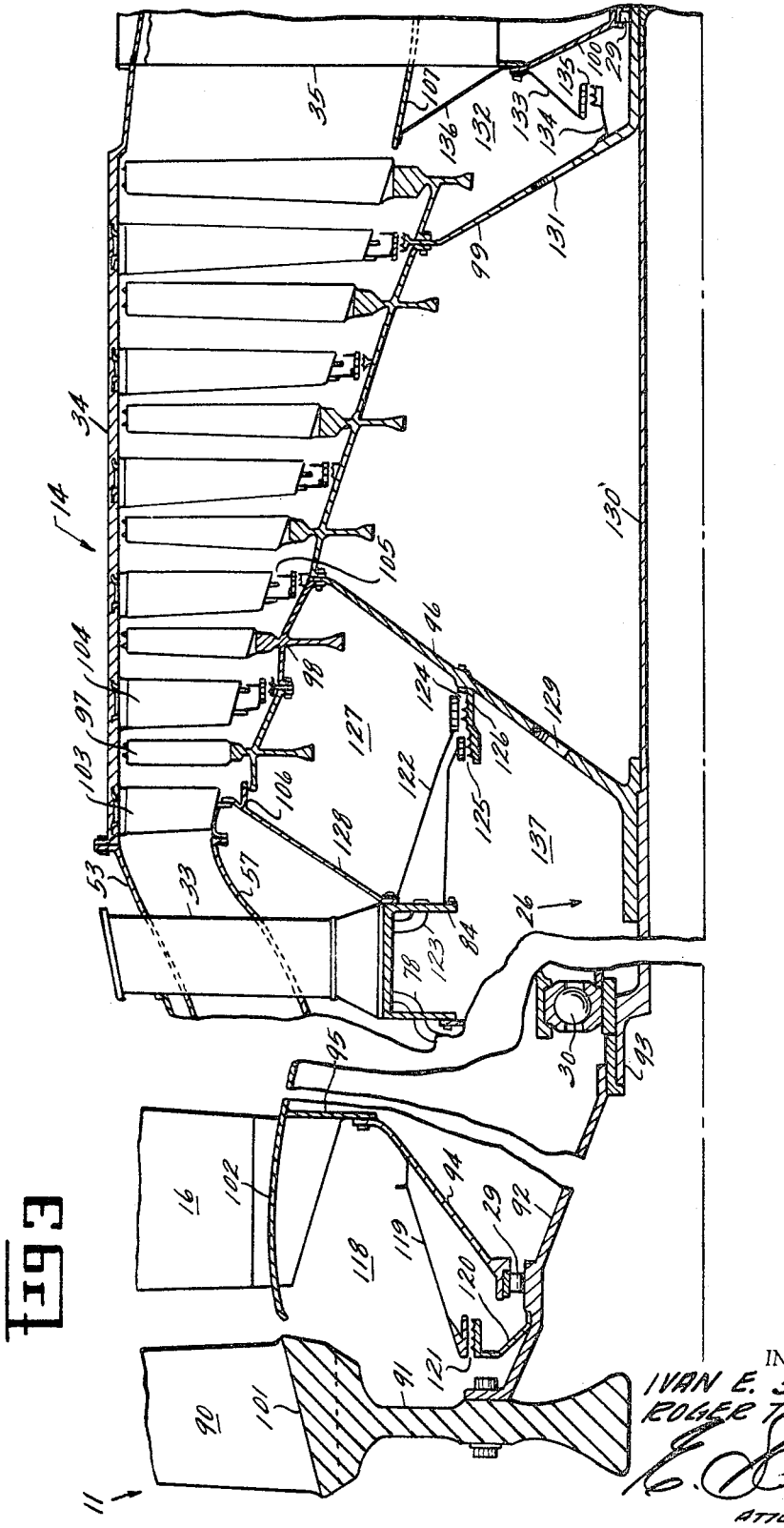

3,433,020
GAS TURBINE ENGINE ROTORS
Roger T. Earle, Jr., Cincinnati, and Ivan E. Sumey, Fairfield, Ohio, assignors to General Electric Company, a corporation of New York
Filed Sept. 26, 1966, Ser. No. 581,984
U.S. Cl. 60—226                                4 Claims
Int. Cl. F02k 3/04; F02g 3/00; F02c 7/12

ABSTRACT OF THE DISCLOSURE

The disclosure shows a gas turbine engine of the turbofan type comprising a core engine for generating a hot gas stream which in turn drives a fan turbine connected to a bladed rotor. The bladed rotor pressurizes an air stream which is discharged through a nozzle to provide a propulsive force. The core engine comprises a rotor having three axially spaced shaft portions of relatively small diameter. The fan turbine and bladed rotor connected thereto comprise a second rotor element. Essentially all of the effective radial surfaces of both rotors are pressurized by portions of the gas flow through the engine, whereby the axial thrust loadings on the rotors are minimized and in a predictable direction.

---

The present invention relates to gas turbine engines and more particularly to a rotating member or members for such engines.

Gas turbine engines incorporate a rotating member, commonly referred to as a rotor, from which blades extend into an annular gas flow path provided through the engine. Generally, the rotor is journaled for rotation by a plurality of bearings. In order to allow for thermal expansion of the rotor and to minimize the stresses therein, it is journaled by only one thrust bearing, the remaining bearings permitting relative axial movement of the rotor. As such, the thrust bearing is subjected to the sum total of the axial forces applied to the rotor.

These forces include the reaction force on the rotor blades as they compress the gas stream or are driven thereby. Additional forces are caused by gas pressures applied to radially extending portions of the rotor. Some of these gas pressures, namely, those on the bladed portions of the rotor, are predictable and may be compensated for in the design of the rotor. This is so because their magnitude is primarily dependent upon the annular gas stream pressure at that point which is a function of engine operating conditions.

However, other gas pressures applied to the rotor between the bladed portions are not so predictable. It has been the practice to provide seals at the ends of the bladed portions of the rotor to minimize the loss of gas from the annular gas stream. The gas that does leak past these seals passes through chambers which are exposed to radial portions of the rotor and through conduits to a downstream portion of the annular gas stream. One of the problems that arises with such an arrangement is that as the seals wear, increased flow of gas through the chambers causes an increase in pressure due to the resistance of the conduits.

This increase in pressure substantially changes the resultant force applied to the thrust bearing and may even change its direction. When these changes occur during normal engine operation, the life of the thrust bearing may be impaired.

Accordingly, it is an object of the present invention to minimize and make unidirectional the axial forces on the rotating member or members of a gas turbine engine independent of seal leakage during normal engine operation.

The above ends are achieved in a gas turbine engine having an annular flow path for a gas stream by providing a rotating member. The rotating member comprises a pair of rotors having blades projecting into the gas stream and a shaft portion, of relatively small diameter therebetween. The rotors and blades are subjected to forces which produce an axial loading on the rotating member which varies in magnitude and direction under different operating conditions of the engine. Means including a thrust bearing are provided for journaling the rotating member. The rotors have surfaces of substantial radial extent other than on the bladed portion thereof.

At least two separate means for forming chambers are provided, the chamber means comprising generally annular wall members and opposing radial surfaces of said rotors. The chamber means have at least one generally annular seal between the wall members and the rotors. Passageway means having a low resistance flow path between said chambers and the gas stream are provided whereby the chambers are maintained at the pressure of the gas stream irrespective of the leakage of gas through the seals. The radial surface areas of the rotors are selected so that the resultant axial force applied to the rotating member is minimized and unidirectional during normal operation of the engine.

The above and other related objects and features of the invention will be apparent from a reading of the following description of the disclosure found in the accompanying drawings and the novelty thereof pointed out in the appended claims.

In the drawings:

FIGURE 1 is a simplified showing of a gas turbine engine in which the present invention is embodied;

FIGURE 2 is a longitudinal section view of a portion of the engine shown in FIGURE 1; and FIGURE 3 is a longitudinal section view of another portion of the engine shown in FIGURE 1.

FIGURE 1 shows in simplified fashion a gas turbine engine 10 of the bypass type comprising a bypass fan 11, a core engine 12, and a low pressure fan turbine 14. An annular shroud 15 provides an inlet for air which is pressurized by the fan 11 for discharge past a series of fan stator vanes 16 to a bypass air exhaust nozzle 18 formed by the shroud 15 and an outer casing 19 of the engine 10. A portion of the fan discharge air passes through an annular inlet duct 20 to the core engine 12 which includes a compressor 21 which highly pressurizes the air for delivery to a combustor 22. Fuel is injected into the combustor 22 by suitable means and the resultant fuel-air mixture is ignited by well known means to provide an annular, high velocity, hot gas stream. The hot gas stream discharged from the combustor 22 passes through a core engine turbine 23 and the fan turbine 14. The hot gas stream from the fan turbine 14 is discharged through an exhaust nozzle 24, thereby providing a propulsive force for the engine 10 which adds to the propulsive force of air discharged from the bypass exhaust nozzle 18.

In the core engine rotor or turbine 23 and the rotor of compressor 21 are interconnected to form a core engine rotor 25. Similarly, the rotor of the low pressure turbine 14 and the rotor of the fan 11 are interconnected to form a fan rotor 26 which is concentric with the core engine rotor 25. The core engine rotor 25 is journaled for rotation by a series of roller bearing assemblies 27 and a thrust bearing 28. The fan rotor 26 is journaled for rotation by a series of roller bearing assemblies 29 and a thrust bearing assembly 30. The roller bearing assemblies 27 and the thrust bearing assembly 28 are structurally mounted to radial struts 31, 33, and 32 respectively which extend to an engine casing 34 of the engine 10. In like fashion, the roller bearing assemblies 29 and thrust bearing assembly 30 are respectively connected to the radial struts 31, 33 and radial struts 35 which also extend to the engine casing 34.

When the engine 10 is in operation, axial forces are applied to the rotors 25 and 26 which are resisted by the thrust bearings 28 and 30 respectively. The fan 11 and the compressor 21 by pressurizing the air passing therethrough produces a reaction force in a forward direction. The high pressure and low pressure turbines 23 and 14 in extracting energy from the hot gas stream produce reaction forces in an aft direction. In addition, the pressures exerted by the annular gas stream on the bladed portions of the fan and core engine rotors produce axial forces on the rotors which are generally opposite to the reaction forces produced by the fan, compressor and turbine. Generally these forces may be related to rotor speed in that they increase with an increase in rotor speed. However, some of the forces increase at different rates from others. As a result, the axial forces resisted by the thrust bearings may change direction as the engine speed is increased, in addition to changing magnitude.

Additional axial forces exerted on the rotors 25, 26 arise from the gas pressures from various sources which are used to cool or balance the rotors between the bladed portions thereof. In accordance with the present invention the pressures on the radially extending portions of the rotors 25 and 26 are maintained at levels which cause the resultant force on the thrust bearings to be minimized and constant in direction for the normal anticipated operating range of the engine 10, e.g., cruise.

Reference is now had to FIGURE 2 which shows in gerater detail the core engine 12. The core engine rotor 25 comprises a plurality of compressor blades 36 circumferentially mounted on a series of interconnected rims 37 to form a multi-stage compressor rotor. The rims 37 are mounted for rotation by a conical rotor element 38 bolted to one of the rims 37 and secured to a tubular shaft 39 journaled in the thrust bearing 28 which is mounted on the radial struts 32 by means of a generally conical support member 41. A second conical rotor element 40 extends from the tubular shaft 39 and is bolted to the rotor of the high pressure turbine 23 which comprises a plurality of turbine blades 43, circumferentially mounted on a pair of turbine discs 44. The turbine discs 44 are interconnected by a conical turbine rotor element 45 and a catenary annular heat shield 46. A second conical turbine rotor element 47 is bolted to the rearward disc 44 and is journaled in the roller bearing 27 which is secured by suitable means (not shown) to the radial struts 33.

An annular flow path for the gas stream through the core engine 12 is provided through the compressor 21 and turbine 23. The annular flow path through the compressor 21 is defined at its outer bounds by the engine casing 34 which has a plurality of circumferentially mounted compressor stator vanes 48 disposed between adjacent stages of compressor blades. An annular duct 49 is spaced from the compressor rotor to form the inner bounds of a compressor discharge diffuser passageway. A second annular duct 51 is bolted to duct 49 and forms the inner bounds of bifurcated cooling passageway around the combustor 22. The annular duct 51 is secured to a turbine inlet nozzle 52 which recives the discharge from the combustor 22. The turbine inlet nozzle 52 is secured to an annular duct 53, which forms the outer bounds of the annular flow path through the turbine 23. A plurality of turbine vanes 54 are circumferentially mounted on the duct 53 between adjacent stages of the turbine blades 43. The annular duct 54 is mounted to the engine casing 34 by means of a structural cone 55 having radial ribs 56 extending to the duct 54. An annular duct 57 is disposed away from the rearward turbine disc 44 to form the inner bounds of the annular flow path from the high pressure turbine 23 to the low pressure turbine 14 (FIGURE 1).

A portion of the annular gas stream through the core engine 12 is used for cooling and other pressurization purposes. In this connection it should be noted that a conical member 60 extends from the inward end of the strut 32 and engages the conical rotor element 38 at a seal 61. The conical member 60 on its outer side defines in part a compressor discharge pressurization chamber 62, pressurized from compressor discharge air which enters the chamber 62 through the opening between the duct 49 and the compressor rotor 21. The air then passes across the seal 61 to a recoup chamber 63 defined around its periphery by an annular duct member 64 which is secured to the base of the radial struts 32. The duct 64 has openings therein to permit flow of air from the recoup chamber 63 through a portion of the struts 32 for returning the air to a downstream point in the gas flow path. The rearward edge of the recoup chamber 63 is defined by a conical member 65 which extends from the base of the struts 32 and engages the tubular shaft 39 at a seal 66.

A potrion of the air in the bifurcated combustor cooling duct is used to cool the turbine blades 43. For this purpose relatively large openings 67 are provided in the duct 51 for passage of air into an engine rotor balance chamber 68, defined in part by an annular duct 69 extending from the rearward edge of the struts 32 to the duct 51 and an annular conical member 70 extending from the duct 51 for engaging the conical rotor element 40 at a seal 73. Airf rom the rotor balance chamber 68 passes through relatively large openings 74 in the conical rotor element 40 to the interior of the engine rotor 25 which is sealed off by a tubular duct member 138 extending from the base of the conical rotor element 40 to the turbine rotor element 47. A series of openings 75 are provided in the interconnecting turbine rotor element 45 for passage of airf rom the interior of the engine rotor 25 into the turbine blades 43 which have suitable passages therein for cooling purposes. A portion of the air from the rotor balance chamber 68 passes across the seal 73 and into a turbine inlet chamber 76 for cooling of the outer end of the forward turbine 44. A relatively large outlet from the chamber 76 is provided by an annular duct 77 which is bolted to the end of duct 51 and is axially positioned from the forward edge of the turbine rotor 44. Thus the air in chamber 76 is permitted to pass into the gas stream passing through the turbine 23 for cooling purposes.

The aft end of the rearward turbine disc 44 is cooled by compressor rotor air. For this purpose a conduit 139 (FIGURE 1) is provided to the struts 33 from a suitable stage of the compressor 21 for passage of air into the hollow struts 33. The struts 33 are capped at their inner ends and conduits 78 extend to an annular cooling air distribution manifold 79 which engages an annular extension member 80 of the turbine rotor element 47 at a pair of seals 81, 82. The air leaking across seal 81 enters a turbine discharge chamber 83, defined in part by the forward portion of a channel-shaped ring 84, secured to the bases of the struts 33 and a conical duct 85 which extends forward to a channel-shaped ring 86, secured to the duct 57. The channel-shaped ring 86 is spaced from the end of the turbine disc 44 to provide an outlet for the air from the turbine discharge chamber to the discharge stream hot gases from the turbine 23.

When the engine 10 is in operation, the pressures in chambers 62, 68, 76, and 83 act on the core engine rotor 25 to produce axial forces which, when added to the previously mentioned forces generated by the compressor and turbine rotors, produce a resultant axial force on the thrust bearing 28. Because each chamber has a relatively large opening to the annular gas stream flowing through the engine, the chambers are maintained at the annnular gas stream pressure at that point. In addition, the relatively large openings offer negligible resistance to flow of gas therethrough, and, as a result, the pressure in the chambers is relatively unaffected by an increase of flow due to seal leakage.

The axial forces on the core engine rotor 25 which result from the pressures in these chambers are primarily dependent upon engine operating conditions because the pressures are directly related to the engine cycle.

The areas over which these forces act are selected by positioning the seal 73 on the conical rotor element 40 to produce a resultant axial force which, when added to the forces caused by the compressor and turbine, gives a net axial force on the thrust bearing 28 which has a minimum value. In addition, the positioning of the seal 73 is selected to give a change in direction of the axial force on the thrust bearing 28 which is below the normal anticipated operating range of the engine 10 to give an axial force on the thrust bearing 28 which is unidirectional and minimized during normal operating conditions of the engine. As a result of minimizing the axial load on the thrust bearing 28, its operating life is greatly enhanced.

Reference is now had to FIGURE 3 which illustrates a similar thrust balancing of the fan rotor 26 (portions of which are shown). The fan rotor 26 comprise a series of circumferentially mounted blades 90 extending from a fan rim 91. The rim 91 is bolted to a stepped conical rotor element 92, secured to a tubular shaft 93.

The conical rotor element 92 is journaled in the roller bearing 29 which is mounted on a structural cone 94, bolted to a flange 95 of the fan stator vane 16 (FIGURE 1). The tubular shaft 93 is journaled in the thrust bearing 30 which is secured to the strut 31 (FIGURE 1) by suitable means (not shown). The tubular shaft 93 extends through the interior of the core engine tubular shaft 39 to a conical rotor element 96 which is bolted to the rotor of the low pressure turbine 14.

The rotor of the low pressure turbine 14 comprises a series of turbine blades 97 circumferentially mounted on interconnected turbine discs 98 to form stages of turbine blades. A conical turbine motor element 99 is bolted to one of the turbine discs 98 and journaled in the roller bearing 29 which is secured to the radial strut 35 by a conical support member 100.

An annular bypass flow through the fan 11 and turbine 14 is provided by an annular shroud 101 which expands between adjacent fan blades 90 at their base. A second annular shroud 102 is disposed away from the rearward edge of the fan rim 91 and defines the inner bounds of the annular flow path which forms an inlet for the core engine 12 (FIGURE 2). The gases flow through the core engine 12 and are discharged from the high pressure turbine 23 into the annular discharge chamber defined by ducts 57 and 53. These ducts extend to a low pressure turbine inlet nozzle 103 which forms the inlet for the low pressure turbine 14. The outer bounds of the annular flow path through the low pressure turbine 14 is formed by the engine casing 34 which has a series of turbine vanes 105 circumferentially disposed between adjacent stages of turbine blades 97. The inner bounds of the flow path through the turbine 14 is defined by the interconnected turbine rims 98 which engage the turbine vanes 104 at seals 105 and at their forward end at a seal 106. The flow path from the turbine 14 is defined at its outer periphery by the engine casing 34 and at its inner periphery by a duct 107, axially spaced from the rearward turbine disc 98, which leads to the engine exhaust nozzle 24 (FIGURE 1).

As with the core engine 12, a portion of the gas stream flowing through the fan 11 and turbine 14 is used for cooling and pressurization purposes. In this connection it should be noted that the duct 102 forms an inlet with the rim 91 for a fan discharge pressurization chamber 118 which is defined on its inner wall by a conical annular duct 119 extending from the structural member 94 for engaging an annular extension 120 of the stepped conical rotor element 92 at a seal 121. Air that enters the chamber 118 passes across the seal 121 and may be ducted back into the engine cycle flow path or used for other purposes. Alternately, seal 121 may be pressurized to pass air through chamber 118 to the fan discharge stream.

A portion of the output of the core engine compressor 21 is used to cool the low pressure turbine in a fashion similar to that used in the core engine 12. For this purpose, air from the struts 33 is transmitted to a hollow triangular distribution manifold 122 by a series of conduits 123. The annular distribution manifold 122 engages a flange 126 of the conical rotor element 96 at a pair of seals 125, 124. Air that leaks past the seal 124 enters a turbine rotor pressurization chamber 127 which is defined in part by a conical duct element 128 which extends from the base of the strut 33 to the duct 57. The annular seal 106 is provided with a substantial clearance so that a relatively large flow path from the chamber 127 to the turbine inlet portion of the rotor 14 is provided.

The air that leaks past the seal 125 passes through an opening 129 in the conical rotor element 96 to a rotor cooling chamber 137 in the interior of the turbine rotor 14. The flow of air is circulated through the interior of the turbine rotor 14 by providing a relatively thin-walled tubular duct 130 which extends from the tubular shaft 93 to the conical turbine rotor element 99. A relatively large opening 131 is provided in the conical rotor element 99 to permit flow of air into a turbine discharge chamber 132 for cooling the aft portion of the turbine rotor 14. An additional source of cooling air is provided into chamber 132 through the hollow radial struts 35 from a suitable source. The air passes into an annular distribution chamber formed by conical duct element 133 which extends from the base of the struts 35 and engages a flange 134 of the rotor element 99 at a seal 135. The air which enters the chamber 132 passes to the relatively large outlet formed by the duct 107 and a conical duct element 136 which extends therefrom to the base of the strut 35.

When engine 10 is in operation, the gas pressure in chambers 118 and 127, 137 and 132 produce axial forces on the fan rotor 26. These forces are added to the forces produced by the fan 11 and the low pressure turbine 14 to produce a resultant axial force which is applied to the thrust bearing 30. Because the chambers are open to the annular gas stream the pressures therein are primarily dependent upon the pressure of the annular gas stream at that particular point. Hence, the pressure in chamber 118 is substantially fan discharge pressure and the pressure in chamber 127 is primarily the turbine inlet pressure. Similarly, the pressure in chambers 137 and 132 are the low pressure turbine discharge pressure. Again it should be noted that the openings in each of these chambers which give them access to the annular gas stream are relatively large to provide a negligible resistance to flow when there is increased wear of the seals provided for the chambers.

The radial areas of the fan rotor 26 over which the pressures in the chambers act are selected by positioning the seals 125 and 126 on the conical rotor element 96 so that the resultant force caused by the pressures in these chambers, when added to the forces produced by the fan 11 and the turbine 26, cause a resultant axial force on the bearing 30 which is minimized and is unidirectional during the normal engine operating conditions. In this connection it should be noted that the fan 11 is subjected to the aerodynamic forces of air impinging thereon when the engine is powering an aircraft. The resultant force on the fan rotor causes the direction of the force on the thrust bearing 30 to be at all times in the aft direction.

The invention thus describes a highly effective means of balancing the rotor in a gas turbine engine of the bypass type irrespective of seal leakage. However, the invention is not limited to this type of engine but may be used advantageously with a turbojet or other types of gas turbine engines.

While the preferred form of the invention has been described, it is to be understood that modifications thereof will be apparent to those skilled in the art without depart-

Having thus described the invention, what is claimed as novel and desired to be secured by Letters Patent of the United States is:

1. A gas turbine engine of the annular flow type having a compressor, a combustor, and a turbine sequentially disposed to generate a hot gas stream, said engine further comprising, a rotor having three axially spaced shaft portions of relatively small diameter, a compressor drum, of relatively large diameter, connected to the upstream and middle shaft portions, a bladed turbine rotor of enlarged diameter connected to the middle and downstream shaft portions, bearing means respectively journaling said shaft portions, frame members respectively supporting said journaling means, means, connected to said middle bearing frame member, defining an annular middle bearing chamber surrounding said middle bearing, means for venting said middle bearing chamber, annular sealing means respectively sealing said middle bearing chamber relative to said rotor, on opposite sides of said middle bearing, each of said annular sealing means having essentially the same effective sealing diameter, a relatively stationary casing defining the gas flow path from said combustor to said turbine and, in part, an annular turbine rotor chamber on the upstream side of said turbine rotor marginally of the bases of the blades thereof, said turbine rotor chamber being in free communication with the hot gas stream entering said turbine, means providing an annular seal between said turbine rotor and said relatively stationary casing, and means for pressurizing the remaining upstream portions of said turbine rotor with air discharged from said compressor, whereby the pressure variations in said middle bearing chamber will have little or no effect on the axial force loadings on said rotor and the force loadings on the upstream surfaces of said turbine and the downstream radial surfaces of the compressor drum are a function of engine cycle pressure and there is controlled flow of relatively cool air through said turbine rotor chamber to the hot gas stream.

2. A gas turbine engine as in claim 1 wherein, the upstream surfaces of said compressor drum and the downstream surfaces of said compressor rotor are directly pressurized from the annular flow path through the engine.

3. A gas turbine engine as in claim 1 further comprising, a fan turbine downstream of said first turbine and driven by said hot gas stream, a fan rotor disposed upstream of said compressor, a shaft connecting said fan turbine and said fan rotor, bearings respectively journaling said shaft adjacent said fan rotor and upstream and downstream of said fan turbine, frame members respectively supporting said journaling means, means defining annular chambers respectively surrounding said journaling means, annular sealing means respectively sealing said chambers on opposite sides of said bearings, each of said annular sealing means for a given chamber being of the same diameter, whereby pressure variations in said chambers will have little or no effect on the force loadings on said rotor.

4. A gas turbine engine as in claim 1 wherein, the forward and rear surfaces of the fan rotor and fan turbine respectively are in direct communication with the annular flow path through the engine at points immediately adjacent thereto, whereby the axial thrust loadings on both rotors are a predictable function of engine operation.

References Cited

UNITED STATES PATENTS

| | | | |
|---|---|---|---|
| 2,791,090 | 5/1957 | Hooker | 60—39.08 |
| 2,647,684 | 8/1953 | Lombard. | |
| 2,746,671 | 5/1956 | Newcomb. | |

FOREIGN PATENTS

| | | |
|---|---|---|
| 759,037 | 10/1956 | Great Britain. |
| 624,494 | 6/1949 | Great Britain. |
| 805,330 | 12/1958 | Great Britain. |

CARLTON R. CROYLE, *Primary Examiner.*

D. HART, *Assistant Examiner.*

U.S. Cl. X.R.

230—122; 253—69; 60—39.66, 39.08; 117—212; 29—590